United States Patent [19]

Leiser et al.

[11] Patent Number: 5,766,322
[45] Date of Patent: Jun. 16, 1998

[54] ORGANOPOLYSILOXANE WATERPROOFING TREATMENT FOR POROUS CERAMICS

[75] Inventors: Daniel B. Leiser, San Jose; Domenick E. Cagliostro, Berkeley; Ming-ta S. Hsu, San Jose; Timothy S. Chen, San Jose, all of Calif.

[73] Assignee: The United States of America as represented by the Administrator of the National Aeronautics and Space Administration, Washington, D.C.

[21] Appl. No.: 745,405

[22] Filed: Oct. 30, 1996

[51] Int. Cl.$^6$ ............................ C09D 4/00; B32B 9/04
[52] U.S. Cl. .................... 106/2; 106/287.12; 427/387; 418/447; 418/668
[58] Field of Search .................. 427/387; 428/447, 428/688; 106/287.12, 2

[56] References Cited

U.S. PATENT DOCUMENTS

| | | | |
|---|---|---|---|
| 2,679,495 | 5/1954 | Bunnell | 427/387 |
| 3,154,431 | 10/1964 | Santelli et al. | 427/387 |
| 3,228,903 | 1/1966 | Dennis et al. | 260/29.6 |
| 3,244,541 | 4/1966 | Fain et al. | 106/13 |
| 3,304,418 | 2/1967 | Brady | 260/448.2 |
| 3,372,052 | 3/1968 | Polniaszek | 427/387 |
| 3,772,065 | 11/1973 | Seiler | 117/123 |
| 4,352,894 | 10/1982 | Schmidt | 521/91 |
| 4,387,195 | 6/1983 | Tully et al. | 525/475 |
| 4,517,375 | 5/1985 | Schmidt | 106/2 |
| 4,648,904 | 3/1987 | DePasquale et al. | 106/2 |
| 5,073,195 | 12/1991 | Cuthbert et al. | 106/2 |
| 5,074,912 | 12/1991 | Liles et al. | 106/2 |
| 5,205,860 | 4/1993 | Narula et al. | 106/2 |

*Primary Examiner*—Melissa Bonner
*Attorney, Agent, or Firm*—Kathleen Dal Bon; Harry Lupuloff; John G. Mannix

[57] ABSTRACT

Rigid and flexible porous ceramics, including thermal insulation of a type used on space vehicles, are waterproofed by a treatment which comprises applying an aqueous solution of an organopolysiloxane waterproofing agent having reactive silanol groups to the surface of the ceramic and then heating the treated ceramic to form a waterproofed ceramic. The organopolysiloxane is formed by the hydrolysis and partial condensation of di- and trialkoxyfunctional alkylalkoxysilanes having 1–10 carbon atom hydrocarbyl groups.

14 Claims, No Drawings

ORGANOPOLYSILOXANE WATERPROOFING TREATMENT FOR POROUS CERAMICS

ORIGIN OF THE INVENTION

The invention described herein was made in the performance of work under a NASA contract and is subject to Public Law 95-517 (13 U.S.C. 2000 et seq.). The contractor has not elected to retain title in the invention.

BACKGROUND OF THE INVENTION

1. Field of the Invention

The invention relates to waterproofing porous ceramics with a silane based waterproofing agent. More particularly, the invention relates to a waterproofing treatment for porous ceramic materials, including rigid and flexible, porous ceramic thermal insulation of a type used on space vehicles, which comprises applying an aqueous solution of an organopolysiloxane waterproofing agent having reactive silanol groups to the surface of the ceramic and then heating the treated ceramic to form a waterproofed ceramic. The organopolysiloxane is formed by the hydrolysis and partial condensation of di- and trialkoxyfunctional alkylalkoxysilanes having 1–10 carbon atom hydrocarbyl groups.

2. Background of the Disclosure

Many types of ceramic materials, and particularly those which are based on or contain one or more inorganic oxides such as silicates, aluminates, aluminosilicates, borates, phosphates, titanates and the like, have hygroscopic surfaces which adsorb or imbibe moisture. Such moisture adsorption can be a significant problem if it adds significantly to the weight of the ceramic and also if the ceramic is exposed to a high temperature environment, such as various types of thermal insulation materials for various thermal protection systems. Thermal protection systems employ both flexible and rigid ceramic insulation, with the flexible insulation often comprising various layers fabricated of ceramic fibers and which may or may not include layers of metal foil. Such thermal protection systems are used on reentry space vehicles, such as the space shuttle which must leave and reenter the earth's atmosphere. The space shuttle requires light weight and very thermally efficient, rigid and flexible exterior thermal protection systems which have to withstand a wide variety of environments, including temperatures of from 1000°–1600° C. Ceramic materials currently in use or in development for such thermal protection systems (TPS) include high purity silicon dioxide, aluminum oxide, silicon carbide, aluminosilicate, aluminoborosilicate and zirconium diboride as illustrative, but nonlimiting examples. In order to be both light weight and thermally protective, these ceramics and ceramic composites are very porous, often having a void volume of over 90%. Except for a rigid, oxidation protected carbon-carbon composite used on the nose and other leading edges of a reentry space vehicle, typical TPS insulation is a rigid or flexible, porous and often hygroscopic ceramic or ceramic composite comprising one or more thermally resistant oxides, carbides, borides, silicides, borosilicates and nitrides as set forth above and disclosed, for example, in U.S. Pat. Nos. 5,038,693, 5,277,959 and 5,296,288, the disclosures of which are incorporated herein by reference. The combination of porosity and hygroscopicity can result in the porous insulation absorbing more than three to five times its own weight of water. This means that the insulation must be waterproofed so that it is does not absorb water from high humidity, rain, snow, salt spray and the like. Besides adding an unacceptable amount to the weight of the insulation, the presence of water in the ceramic insulation can create other problems, such as freeze-thaw damage and explosive vaporization on rapid exposure to very high temperatures, such as reentry into earth's atmosphere. On one occasion where a waterproof coating was applied to the surface of the tiles, a hail storm at the Kennedy Space Center damaged the coating allowing water to be imbibed into the porous tiles. This water froze on ascent and orbit and could turn to vapor on heating during reentry causing the steam to blow the tiles off the vehicle. So many tiles on the Space Shuttle were damaged, the orbital time line of the vehicle had to be changed to provide a favorable Sun attitude to drive the water out of the tiles before reentry. Flexible ceramic insulation is more forgiving with respect to freeze/thaw damage but the excess weight of the absorbed water is still a significant problem.

Waterproofing agents applied to thermal insulation on space vehicles must not significantly add to the weight of the vehicle. Presently used waterproofing treatments use materials such as silanes, which are toxic, volatile, expensive and require multiple treatments of large amounts of the waterproofing material. In the case of volatile waterproofing agents, such as silanes, the TPS must be covered with a relatively impermeable covering, such as polyethylene, so it doesn't evaporate before it can waterproof the insulation. This is done in sections and the silane waterproofing agent is injected into each section of covered insulation, making it labor intensive, time consuming and expensive. Therefore, there is still a need for a waterproofing agent which is relatively nontoxic, nonvolatile and easily applied. It would be a still further improvement if the waterproofing agent could be brushed, sprayed or flowed on and not have to be carefully injected into the insulation with a syringe type device at multiple injection points over the surface of the insulation.

SUMMARY OF THE INVENTION

The present invention relates to the discovery that hygroscopic ceramic materials can be waterproofed by treating the ceramic with a waterproofing agent comprising an aqueous solution of a water soluble, relatively low molecular weight, partially condensed organopolysiloxane which possesses unreacted silanol groups and heating the treated ceramic to form a waterproofed ceramic. This waterproofing treatment and material is nontoxic, adds very little weight to the insulation and, while unlike conventional organic coating materials, the aqueous waterproofing solution is easily applied to the ceramic by any means used to apply conventional organic coating materials, such as spray, brush, roller, flow and the like, as is known to those skilled in the art. The aqueous organopolysiloxane solution is formed by the hydrolysis and partial condensation of a mixture of di- and trialkoxyfunctional organosilanes with water, in which the di- and tri- functionality resides in alkoxide groups attached to the silicone atom. This hydrolysis and partial condensation is formed in the absence of added acid or base. The organic groups in the molecules of the silane reactants are 1–10 carbon atom hydrocarbyls and more preferably from 1–4 carbon atom alkyl groups. To form an aqueous waterproofing solution useful in the practice of the invention in an embodiment in which the hydrocarbyl groups are alkyl groups, a mixture of a dialkyldialkoxysilane and an alkyltrialkoxysilane are reacted with water to hydrolyze and partially condense the siloxane reagents to form an aqueous solution of low molecular weight polyorganosiloxane having unreacted silanol groups. The molar ratio of the diorganodialkoxysilane to the organotrialkoxysilane in the mixture can broadly range from as low as about 1:1 to as high as about 20:1. However, it is preferred that the diorganodialkoxysilane to be present in an amount greater than that of the organotrialkoxysilane to avoid excessive branching, crosslinking and subsequent gelling of the reactants. The amount of water used for the hydrolysis reaction is generally about stoichiometric. By organosiloxane is meant that at least one Si—C group is attached to each silicone atom. The partially condensed, water soluble polyorganosiloxane waterproofing agent is a low molecular weight, partially polymerized material and most probably comprises one or more oligomers. The aqueous solution of waterproofing material is applied by spray, brush, roller, flow and the like as is a conventional organic coating material. The waterproofing solution is applied to the substrate as a thin, oily material. In the case of waterproofing a porous ceramic substrate, the waterproofing solution penetrates by capillary action into the pores and interior of the ceramic to coat its interior surfaces, but does not form a continuous coating on the exterior or outer surface to seal it and thereby prevent moisture, rain and gas from entering into the interior of the ceramic. Thus, the waterproofed porous ceramic remains porous after the waterproofing treatment of the invention. For a typical waterproofing application, the reaction product of the organosiloxane reactants and water is diluted down to a low concentration with water and will generally contain less than 10 wt. %, typically less than 5 wt. % and, in some embodiments, 2 wt. % of the reaction product which comprises the low molecular weight, partially condensed organopolysiloxane having unreacted silanol groups. In one embodiment in which porous ceramic insulation was waterproofed according to the practice of the invention by treatment with an aqueous, reactive silanol-containing organopolysiloxane waterproofing solution formed by the hydrolysis and condensation of a mixture of dimethyldiethoxysilane and methyltrimethoxysilane with water, the amount of organopolysiloxane present in the aqueous coating solution was 2 wt. %. The treated ceramic is heated to a slightly elevated temperature (e.g., 100° C.) to complete the waterproofing treatment and make the ceramic waterproof. In the case of porous ceramic insulation on a space vehicle such as a space shuttle, a heat gun, heat lamps or other facile and convenient means of heating can be used to achieve waterproofing of the insulation on the shuttle. The aqueous waterproofing solution used for the waterproofing treatment of the invention is relatively nontoxic as it comprises a solution of the partially condensed organopolysiloxane in water and some alcohol. A minor amount of alcohol is present from the hydrolysis reaction. If desired, additional alcohol may be added to the solution to achieve desired drying properties. However it has been found that the addition of water alone yields satisfactory results. Thus, the aqueous waterproofing solution of the invention does not contain more toxic solvents such as toluene, xylene, naphthas, lacquer thinner and the like which are generally found in conventional coating materials.

DETAILED DESCRIPTION

As set forth above, the waterproofing solution used in the waterproofing treatment of the invention comprises an aqueous solution of a water soluble, relatively low molecular weight, partially condensed organopolysiloxane which possesses unreacted silanol groups and which is formed by the hydrolysis and partial condensation of a mixture of di- and trialkoxyfunctionial organosilanes with water and in which the organic groups are 1–10 carbon atom hydrocarbyls. The di- and trialkoxyfunctional organosilanes are of the formula $RR'Si(OR")_2$ and $RSi(OR")_3$ wherein R and R' are nonhydrolyzable organic radicals and are the same or different hydrocarbyl group having 1–10 carbon atoms, preferably 1–6, more preferably 1–4 and still more preferably 1–2 carbon atoms and wherein R"0 is a 1–4 carbon atom alkyl and preferably a 1–2 carbon alkyl group (methyl or ethyl). By organosilane is meant that each siloxane reactant has at least one Si—C bond and in the context of the invention includes one and two Si—C bonds. By hydrocarbyl is meant a hydrocarbon group of carbon and hydrogen and includes alkyl, cycloalkyl, alkenyl and aryl groups in which the aryl group is a phenyl radical which can have one or two alkyl groups of one or two carbon atoms attached. Thus, the aryl group may have 6–8 carbon atoms, depending on whether or not the phenyl radical has one or two alkyl groups attached to it. In a preferred embodiment R and R' are 1–4 carbon atom alkyl groups, in which case the siloxane reactants comprise a mixture of alkylorganosiloxane and dialkylorganosiloxane. The mole ratio of the alkoxy difunctional organosiloxane reactant $[RR'Si(OR")_2]$ to the alkoxy trifunctional organosiloxane reactant $[RSi(OR")_3]$ in the reaction mixture will broadly range from 1–20, preferably from 3–16 and still more preferably from 4–10. In one particular embodiment in which the waterproofing solution is formed by the hydrolysis and partial condensation of a mixture of dimethyldimethoxysilane (DMDES) and methyltrimethoxysilane (MTMTS) with water, it is preferred that the mole ratio of the DMDES to the MTMTS be within the range of from about 4–10 for optimum results. The so-formed waterproofing solution is fairly stable with a shelf life on the order of months, because the unreacted silanol groups react very slowly at room temperature and because the amount of the trifunctional organosiloxane responsible for extensive branching and crosslinking is not used in an amount more than the primarily linear chain forming difunctional organosiloxane. The reaction is accomplished simply by mixing the three reactants together and mildly heating for a period of time to form the waterproofing solution. Heating the mixture overnight at a temperature of from 40°–60° C. has been found to be effective, however other time and temperature regimes may be employed at the discretion of the practitioner. Also, waterproofing solutions of the invention have been formed in the laboratory under a closed system environment in which all of the reactants and reaction products remain in the mixture. It is also significant that the hydrolysis and partial condensation reactions which form the waterproofing solution of the invention occur without the addition of any acid or base to the reaction mixture. Heating the reaction mixture for too long a time or at too high a temperature will reduce the waterproofing effectiveness of the solution and may also precipitate out of solution at least a portion of the polymeric material, due to continued condensation and crosslinking which will render it insoluble. When the aqueous waterproofing solution is applied to the substrate or ceramic article which is to be waterproofed and dried to remove the water, mild heating of the coated ceramic completes the reactions and the waterproofing treatment. This heating cures the organopolysiloxane liquid applied to the ceramic to thereby render it waterproof. Those skilled in the art will appreciate that there are no absolutes in time and temperature regimes required to cure the organopolysiloxane to waterproof the ceramic. However, by way of an illustrative, but nonlimiting example, ceramics have been effectively waterproofed according to the practice of the invention by heating the ceramic which has been coated or impregnated with the organopolysiloxane of the invention at a temperature of 100° C. for one hour.

The desired reaction product is a somewhat linear, water soluble, liquid organopolysiloxane without extensive branching or crosslinking and which possesses unreacted silanols. When the two organosiloxanes are reacted with water, a hydrolysis reaction occurs which hydrolyses the alkoxy groups to form reactive silanol groups on the reactants. One or more alcohols are also produced, with the chemistry of the alcohol determined by the organic portion of the alkoxy group. These reactive silanol groups then condense with each other to form a polymer which, as stated above, is a relatively low molecular weight, water soluble organopolysiloxane and which most probably comprises a mixture of organopolysiloxane oligomers. The reaction product has the appearance of an oily liquid. While not wishing to be held to any particular theory, the presence of unreacted silanol groups is believed to enhance the waterproofing ability of the so-formed waterproofing solution of the invention, because they can condense with other silanol groups present on the surface of insulation fabricated of siliceous material or material which includes silicates. Further, to the extent that most oxide, borate, etc., materials possess highly polar components, including bonded oxygen, it is also quite probable that the unreacted silanol groups on the oligomer or oligomers of the waterproofing solution form some type of bond with groups present on the surface of these materials also, even if only secondary bonding.

If the aqueous waterproofing solution formed by the hydrolysis and partial condensation reactions is applied to a porous ceramic, such as a porous thermal insulating material, in its undiluted form, it will add too much weight to the ceramic. Accordingly, therefore, prior to using it as a waterproofing agent for such ceramic materials, it is first thinned out or diluted with water to a concentration of less than 10 wt. %, preferably less than 5 wt. % and, for some applications no more than 2 wt. %. If desired, one or more alcohols may be added along with the water to achieve desired drying properties. However, it has been found that the use of only water will satisfactory for most applications. The final solids content and viscosity are determined empirically by the practitioner for a particular waterproofing treatment. The waterproofing treatment of the invention has been demonstrated with a variety of flexible and rigid, porous ceramics used as thermal insulation on a space shuttle. However, these demonstrations are meant to be illustrative, but nonlimiting with respect to the practice of the invention. Thus, the waterproofing treatment of the invention is applicable to many other inorganic and ceramic materials such as earthenware, cement, plaster, furnace insulation, electrical insulators and the like.

The invention will be further understood with reference to the examples below.

EXAMPLES

In the examples below, various rigid and flexible, porous thermal insulating materials which have been used for the thermal protection system on the space shuttle were used to evaluate the waterproofing properties of the waterproofing coating of the invention. These porous insulating materials included AFRSI, TABI, FRCI and AETB. The AFRSI (Advanced Flexible Reusable Surface Insulation) is a flexible composite blanket type of insulation having top or outer surface fabric layer of silica fibers and a bottom surface fabric layer of borosilicate glass, with a batting in the middle of 100% silica fibers. The TABI (Tailorable Advanced Blanket Insulation) is also a flexible composite having a top and bottom surface fabric layer of silicon carbide fiber, with an interior fill or batting of Saffil (5% $SiO_2$ and 95% $Al_2O_3$) fiber. FRCI (Fibrous Refractory Composite Insulation) is a rigid tile composed of a rigidized mixture of 78% silica and 22% aluminoborosilicate fibers. The AETB (Advanced Enhanced Thermal Barrier) is also a rigid tile type of thermal insulation and has a composition of 68% silica, 12% aluminoborosilicate and 20% alumina fibers.

Examples 1-4

An aqueous waterproofing solution of the invention was prepared by adding 2.4 g of methyltrimethoxysilane to 20.0 g of dimethyldimethoxysilane with stirring and then slowly adding 4.8 ml of distilled, deionized water with stirring to the siloxane mixture.. This mixture was then sealed so that none of the water or the alcohol formed by the hydrolysis reaction would escape and stirred at 60° C. overnight. After cooling to room temperature, the concentrated solution was diluted down to 2 wt. % polyorganosiloxane by adding water slowly with stirring, to obtain a waterproofing solution of the invention. One inch squares of the various insulation types given above were weighed, immersed in the 2% waterproofing solution, removed and dried in air for 24 hours and then heated at 100° C. in air for one hour to cure the organopolysiloxane and waterproof the insulation. They were then reweighed to determine the weight of the waterproofing treatment.

The waterproofed samples were immersed in water for periods of 15 min., 2 hours and 24 hours, drained to remove excess water and reweighed to determine the effectiveness of the waterproofing. The results are set forth in Table 1 below and demonstrate the effectiveness of the waterproofing treatment of the invention. Thus, inspection of the data shows that after 15 min. immersion in water, the water pickup for the AFRSI blanket and the AETB and FRCI tiles was less than 2 wt. %, while for the TABI blanket it was a little less than 7 wt. %.

TABLE 1

| Sample | Sample wt. g | Wt. g, after waterproofing | % of water pickup after water immersion | | |
|---|---|---|---|---|---|
| | | | 15 min. | 2 hours | 24 hours |
| AFRSI | 3.72 | 3.77 | 2.0 | 6.6 | 15.0 |
| TABI | 7.04 | 6.97 | 6.5 | 9.1 | 33.5 |
| FRCI | 1.30 | 1.28 | 1.3 | 2.2 | 25.0 |
| AETB | 2.29 | 2.32 | 1.0 | 2.7 | 26.7 |

Comparative Examples A-E

In these comparative examples the insulation samples were waterproofed with materials which are known and recommended waterproofing agents for porous ceramic insulation, including Glassclad® CPS-200 and GE-SF99. Glassclad CPS-200 is a waterproofing product of Huls America Inc. which comprises a modified organosilane in a solvent comprising 40% 2-methyl-2-propanol and 40% 4-hydroxy-4-methyl-2-pentanone. The GE-SF99 is a waterproofing material commercially available from General Electric (Silicone Division). It was applied as a solution of 2 wt. % waterproofing agent in water. The treated samples were immersed in water for 15 minutes and weighed to determine the water pickup. Two of the samples received special surface pretreatments before the waterproofing agent was applied and are identified in the Table below. The results of these experiments are listed in Table 2 below.

TABLE 2

| Sample | Sample wt. g | Waterproof Treatment | Wt. g. after waterproof. | % Water Pickup |
|---|---|---|---|---|
| A-AFRSI | 2.98 | SP99 2% wt. in water, 24° C., 72 hr | 3.23 | 9.1 |
| B-AFRSI | 1.34 | Glassclad (PCS2000) 5% wt., 100° C., 20 hr | 1.29 | 39.8 |
| C-AFRSI | 1.55 | MTMS 2% wt., 100° C., 1 hr | 1.63 | 7.7 |
| D-TABI | 2.82 | Glassclad (PCS2000), 5% wt., 100° C., 24 hr | 2.90 | 82.2 |
| E-TABI | 2.77 | MTMS in water, 50° C. 3 hr | 3.03 | 433 |

These results clearly demonstrate the superiority of the waterproofing treatment of the invention compared to the prior art waterproofing agents; the polymer of this invention imparting better water repellency in shorter time than the other agents.

Examples 5–8

These experiments are similar in all respects to Examples 1–4, except for modifications in the ratio of the organosiloxane reactants. Thus, in one experiment a mixture of 2.50 g of DMDES and 2.30 g of MTMS were mixed with 1.20 g of water and the solution stirred in a closed system overnight at 60° C. to obtain the reaction product which is the waterproofing agent of the invention. This was then diluted to 2 wt. % of the waterproofing agent or with water.

In another experiment a mixture of 2.50 g of DMDES and 1.15 g of MTMS were mixed with 0.80 g of water, the solution stirred in a closed system overnight at 60° C. and then diluted to 2 wt. % with water.

In a third experiment a mixture of 5.00 g of DMDES and 1.15 g of MTMS were mixed with 1.25 g of water, the solution stirred in a closed system overnight at 60° C. and then diluted to 2 wt. % with water.

In a fourth experiment a mixture of 5.00 g of DMDES and 0.60 g of MTMS were mixed with 1.20 g of water, the solution stirred in a closed system overnight at 60° C. and then diluted to 2 wt. % with water.

Samples of the AFRSI, TABI, FRCI and AETB insulation were immersed in the 2 % water solutions, dried for 24 hours and then heated at 60° C. for one hour to waterproof the samples. The waterproofed samples were then immersed in water for 15 minutes to determine the water pick-up. The results are similar to those in Table 1.

Example 9

A mixture of 12.2 g of diphenyldimethoxysilane and 1.36 g of MTMS were mixed with 2.5 g of water and stirred overnight in a closed system at 40–60° C. The liquid reaction product was then diluted with water to form a 1 wt. % waterproofing solution. A piece of FRCI tile (FRCI-12) was immersed in the 1% solution, removed, air dried and then cured for 1–2 hours at 100° C. to waterproof the sample. The waterproofed sample was then immersed in water for 15 minutes, removed and weighed. The water pick-up was found to be only 1.5 wt. %.

Example 10

A mixture of 10.9 g of methylphenyldimethoxysilane (MPDMS) and 1.36 g of MTMS were mixed with 2.7 g of water and stirred overnight in a closed system at 40–60° C. The liquid reaction product was then diluted with water to form a 1 wt. % waterproofing solution. A piece of FRCI tile (FRCI-12) was immersed in the 1% solution, removed, air dried and then cured for 1–2 hours at 100° C. to waterproof the sample. The waterproofed sample was then immersed in water for 15 minutes, removed and weighed. The water pick-up was found to be only 1.8 wt. %.

Example 11

A mixture of 10.9 g of (MPDMS) and 1.78 g of isobutyltrimethoxysilane were mixed with 2.7 g of water and stirred overnight in a closed system at 40°–60° C. The liquid reaction product was then diluted with water to form a 1 wt. % waterproofing solution. A piece of FRCI tile (FRCI-12) was immersed in the 1 % solution, removed, air dried and then cured for 1–2 hours at 100° C. to waterproof the sample. The waterproofed sample was then immersed in water for 15 minutes, removed and weighed. The water pick-up was found to be only 1.6 wt. %.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A waterproofing treatment for a ceramic article which comprises heating a reaction mixture comprising a dialkoxyfunctional organosilane, a trialkoxyfunctional organosilane and water to form a solution of a water soluble organopolysiloxane which possesses unreacted silanol groups and which is optionally diluted with additional water, applying said solution to said article, drying said solution on said ceramic article to form a treated ceramic article, and heating said treated ceramic article to cure said organopolysiloxane and form a waterproofed ceramic article.

2. A waterproofing treatment according to claim 1 wherein said reaction occurs without adding any acid or base to said reaction mixture.

3. A waterproofing treatment according to claim 2 wherein the mole ratio of said dialkoxyfunctional organosilane to said trialkoxyfunctional organosilane in said reaction mixture is between 1–20.

4. A waterproofing treatment according to claim 2 wherein said water soluble organopolysiloxane comprises a mixture of partially condensed oligomers.

5. A waterproofed ceramic having a heat cured organopolysiloxane on its surface, said organopolysiloxane being a partially condensed, water soluble polysiloxane having free silanol groups prior to said curing.

6. A ceramic according to claim 5 wherein said ceramic is a porous ceramic.

7. A ceramic according to claim 5, wherein said ceramic is a flexible ceramic.

8. A method for waterproofing rigid and flexible ceramics which comprises reacting a mixture comprising a dialkoxyfunctional organosilane of the formula RR'Si(OR")$_2$, a trialkoxyfunctional organosilane of the formula RSi(OR")$_3$ and water, in which the mole ratio of said dialkoxyfunctional organosilane to said trialkoxyfunctional organosilane in said mixture is between 1-20 and in which the organic groups on said organosilanes are 1-10 carbon atom hydrocarbyls, wherein R and R' are the same or different and are nonhydrolyzable, and wherein said hydrocarbyls are hydrocarbon groups of carbon and hydrogen and include alkyl, cycloalkyl, alkenyl, and aryl groups in which the aryl group is a phenyl radical which can have one or two alkyl groups of one or two carbon atoms attached, to form an aqueous solution of a water soluble organopolysiloxane having free silanol groups and which is optionally diluted with additional water, and coating the surface of said ceramic with said solution, drying said solution on said ceramic and heating said coated ceramic to cure said organopolysiloxane and thereby waterproof said ceramic.

9. A method according to claim 8 wherein said organic radicals have from 1-6 carbon atoms.

10. A method according to claim 9 wherein said ratio ranges from 3-16.

11. A method according to claim 10 wherein said hydrocarbyl groups are alkane groups having from 1-4 carbon atoms.

12. A method according to claim 11 wherein said reaction mixture does not contain any added acid or base.

13. A method according to claim 12 wherein R" is a 1-2 carbon alkyl group.

14. A method according to claim 13 wherein said waterproofing solution is formed by the hydrolysis and partial condensation of a mixture of dimethyldimethoxysilane, methyltrimethoxysilane and water.

* * * * *